(12) United States Patent
Johannison et al.

(10) Patent No.: US 11,673,345 B2
(45) Date of Patent: Jun. 13, 2023

(54) DEVICE AND PROCESS FOR INTRODUCING PERFORATIONS INTO LAMINATES

(71) Applicant: Mölnlycke Health Care AB, Gothenburg (SE)

(72) Inventors: Ulf Johannison, Landvetter (SE); Steen Jörgensen, Gothenburg (SE)

(73) Assignee: Mölnlycke Health Care AB, Gothenburg (SE)

( * ) Notice: Subject to any disclaimer, the term of this patent is extended or adjusted under 35 U.S.C. 154(b) by 85 days.

(21) Appl. No.: 17/433,725

(22) PCT Filed: Feb. 24, 2020

(86) PCT No.: PCT/EP2020/054734
§ 371 (c)(1),
(2) Date: Aug. 25, 2021

(87) PCT Pub. No.: WO2020/173855
PCT Pub. Date: Sep. 3, 2020

(65) Prior Publication Data
US 2022/0134681 A1    May 5, 2022

(30) Foreign Application Priority Data
Feb. 26, 2019    (EP) .................................... 19159428

(51) Int. Cl.
  *B29C 65/08* (2006.01)
  *B29C 65/74* (2006.01)
  *B29C 65/00* (2006.01)

(52) U.S. Cl.
  CPC ........ *B29C 65/7443* (2013.01); *B29C 65/086* (2013.01); *B29C 65/7437* (2013.01); *B29C 66/81413* (2013.01); *B29C 66/81433* (2013.01)

(58) Field of Classification Search
  CPC ............. B29C 65/7443; B29C 65/086; B29C 65/7437; B29C 66/81413; B29C 66/81433
  (Continued)

(56) References Cited

U.S. PATENT DOCUMENTS

| 4,747,895 A | 5/1988 | Wallerstein |
| 2006/0243367 A1 | 11/2006 | Engelhart |
| 2010/0218881 A1* | 9/2010 | Yamamoto ........ B29C 66/81427 156/580.2 |

FOREIGN PATENT DOCUMENTS

| EP | 1 112 823 | 7/2001 |
| EP | 2 382 069 | 11/2011 |

(Continued)

OTHER PUBLICATIONS

International Preliminary Report on Patentability dated Aug. 25, 2021 by the International Searching Authority for Application No. PCT/EP2020/054734 which was filed on Feb. 24, 2020 and published as WO/2020/173855 on Sep. 3, 2020 (Applicant—Mölnlycke Health Care AB // Inventor: Johannison.) (7 pages).

(Continued)

*Primary Examiner* — James D Sells
(74) *Attorney, Agent, or Firm* — Ballard Spahr LLP

(57) ABSTRACT

Described is a ultrasonic welding of laminates, more particular to the use of ultrasonic energy to create stable perforations in a laminate, in particular a laminate that includes a silicone gel. Specifically, a perforation element is provided, that is optionally part of array of perforation elements, which perforation element or array of perforation elements is advantageously used in an ultrasonic welding device and in a process for continuously introducing perforations into a laminate.

18 Claims, 5 Drawing Sheets

Figure 3:
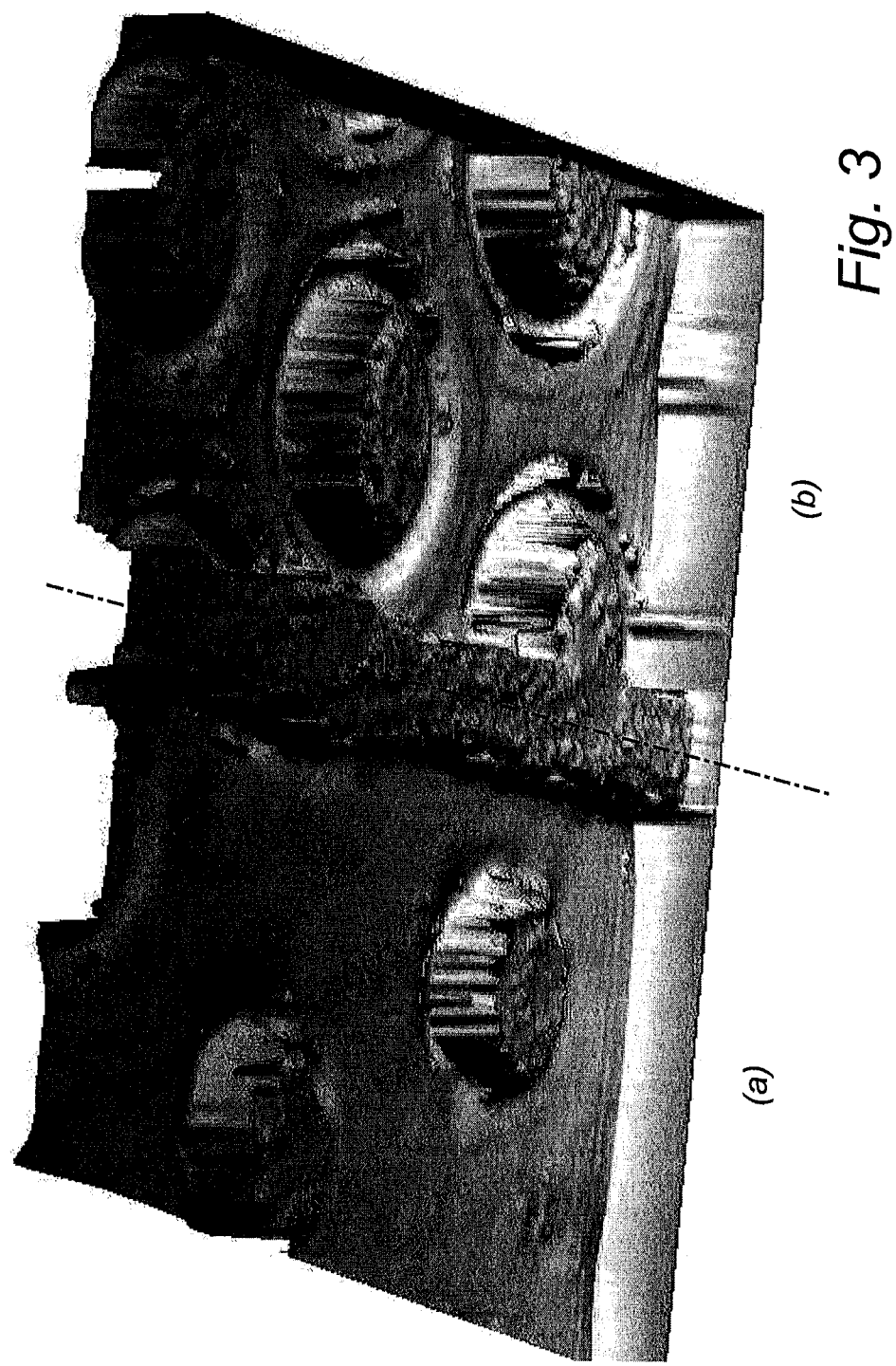

(58) Field of Classification Search
USPC ........................................................ 156/73.1
See application file for complete search history.

(56) References Cited

FOREIGN PATENT DOCUMENTS

| WO | WO 2009/031948 | 3/2009 |
| WO | WO 2010/061228 | 6/2010 |
| WO | WO 2015/107484 | 7/2015 |

OTHER PUBLICATIONS

International Search Report and Written Opinion issued in PCT/EP2020/054734 dated May 26, 2020 (Applicant—Mölnlycke Health Care AB) (9 pages).
Anonymous "rim, n.1: Oxford English Dictionary" Aug. 20, 2019; https://www.oed.edu/view/Entry/165983?rskey=Cw7ak0&result=1&isAdvanced=false#eid.

* cited by examiner

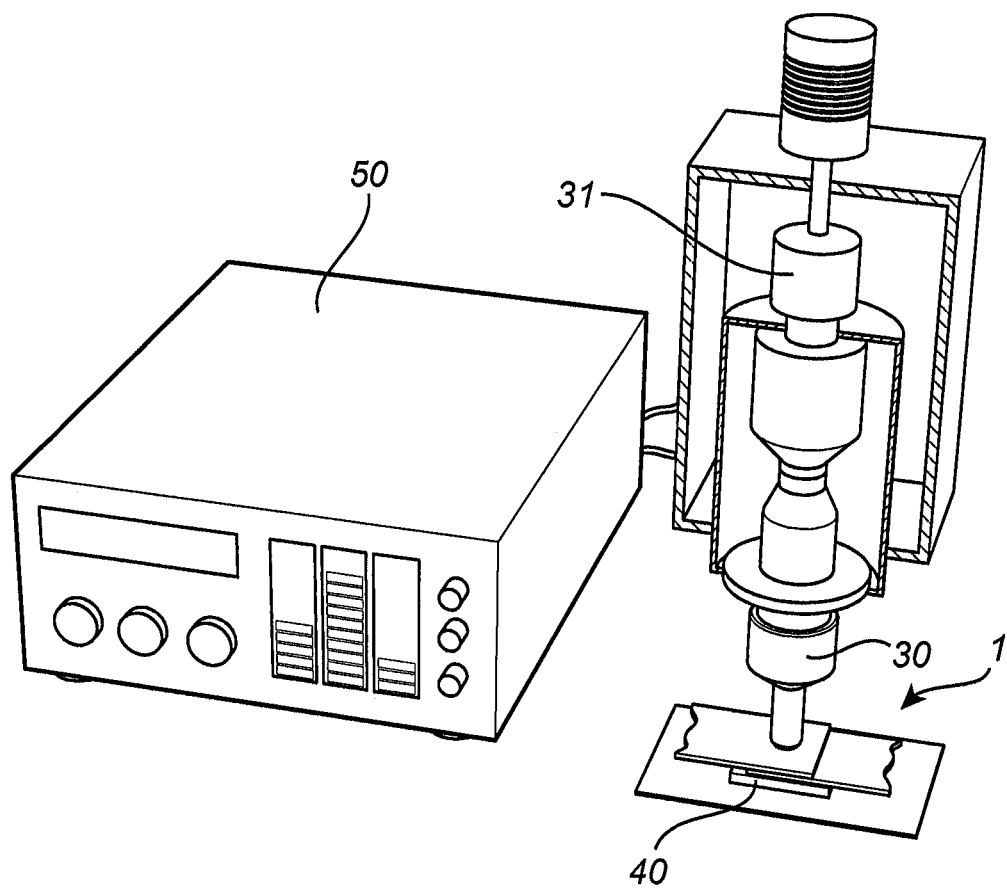
Fig. 1
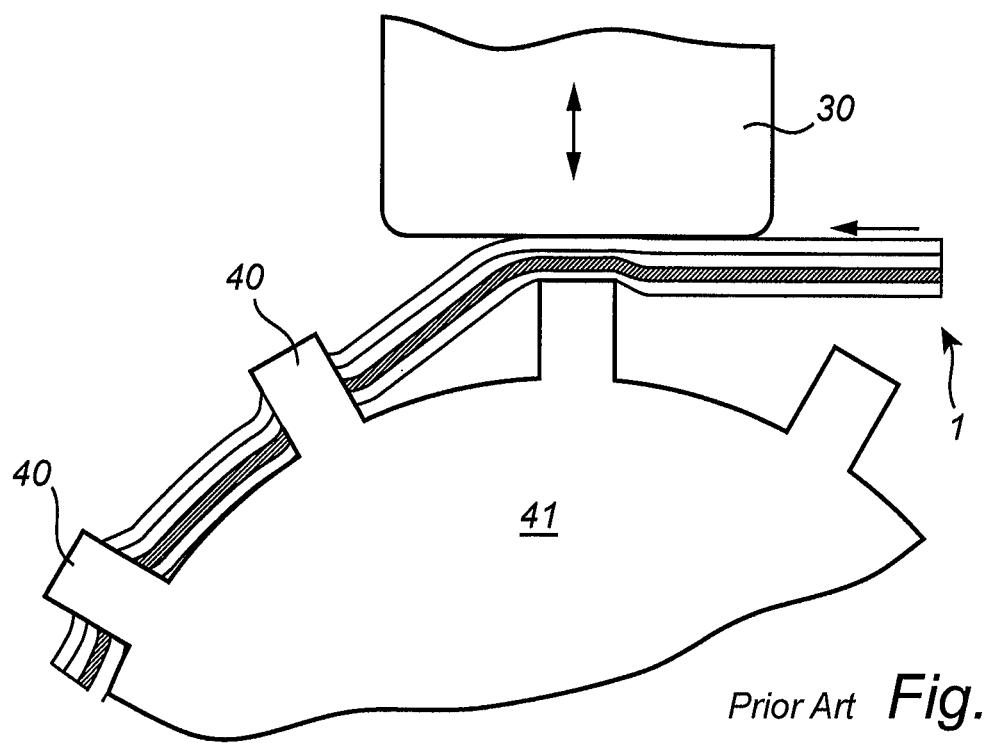
Prior Art Fig. 2

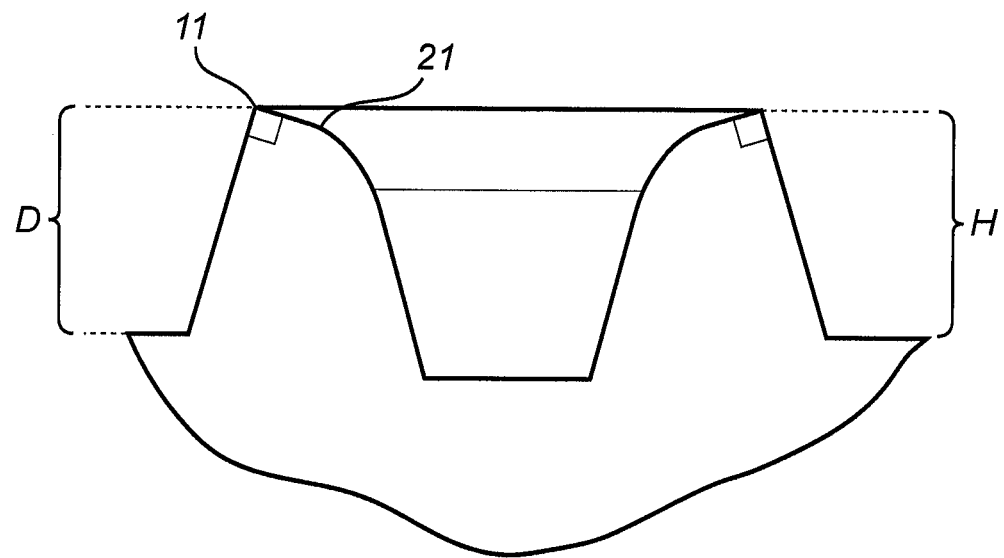
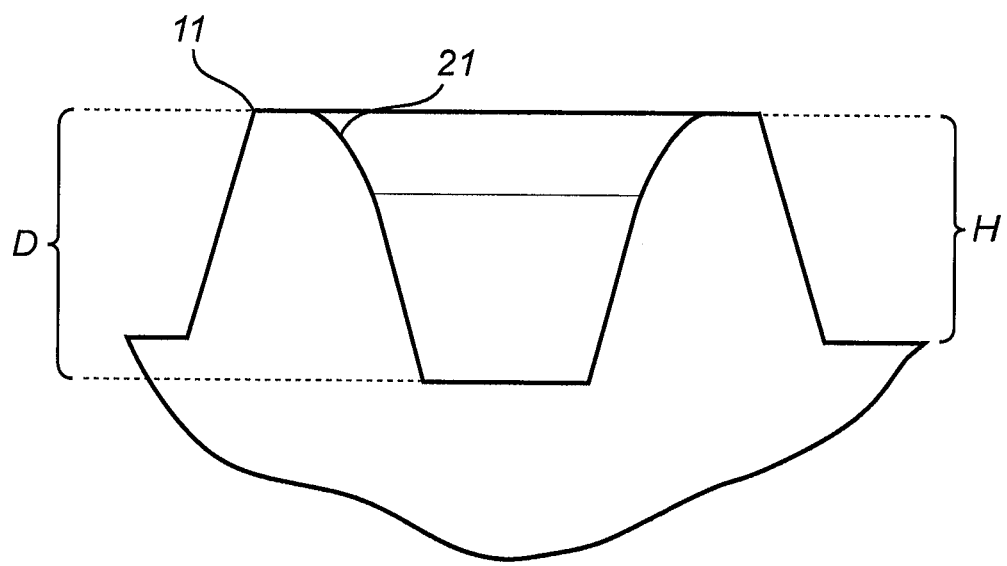
Fig. 7

DEVICE AND PROCESS FOR INTRODUCING PERFORATIONS INTO LAMINATES

CROSS-REFERENCE TO RELATED APPLICATIONS

This application is a U.S. National Phase Application of International Application No. PCT/EP2020/054734, filed Feb. 24, 2020, which claims priority to European Application No. 19159428.2, filed Feb. 26, 2019, each of which are hereby incorporated by reference in their entirety.

FIELD OF THE INVENTION

The present invention relates to the ultrasonic welding of laminates, more particular to the use of ultrasonic energy to create stable perforations in a laminate, in particular a laminate that comprises a silicone gel. Specifically, a perforation element is provided, that is optionally part of array of perforation elements, which perforation element or array of perforation elements is advantageously used in an ultrasonic welding device and in a process for continuously introducing perforations into a laminate.

The perforation element is characterized by a characteristic maximum width and/or outer perimeter and a recess, both of which, i.e. recess and maximum width/outer perimeter, together define an outer lateral surface and an inner lateral surface, both of which optionally are inclined against a surface normal (longitudinal axis), however in opposite directions. An outer rim of the outer lateral surface may have, optionally be, a sharp edge, preferably a cutting edge, while the inner lateral surface may have a rounded (convex, i.e. bulged towards the outside) portion directed towards said outer rim.

This geometry, in conjunction with ultrasonic welding, allows for a reproducible introduction of perforations into a laminate, reducing "build-up" of material around the edges of the perforations and/or for the removal of the "out-perforated" segments away from the laminate, for example by way of transfer of out-perforated segments to a sacrificial substrate.

BACKGROUND OF THE INVENTION

Ultrasonic welding is known as a suitable technique of joining or modifying complex parts or structures, including laminates of materials (1) that typically comprise at least one thermoplastic layer. The parts or layers to be joined or modified are typically sandwiched between a fixed shaped nest [perforation element (40)] and a sonotrode (horn) (30) connected to a transducer (31) (see FIG. 1 for a schematic drawing of such an ultrasonic welding device). Typically, a ~20 kHz low-amplitude acoustic vibration is emitted (other common frequencies used in ultrasonic welding of thermoplastics are 15 kHz, 20 kHz, 30 kHz, 35 kHz, 40 kHz and 70 kHz). When welding plastics, the interface between perforation element (40) and sonotrode (30) is specially designed to "concentrate" the energy input for localized melting. The ultrasonic energy (locally) melts the laminate at the point contact between the parts, creating a joint or, depending on energy input and contact time, a hole.

Ultrasonic welding specifically for the purposes of creating perforations in a laminate is known, in principle, for example from U.S. Pat. No. 4,747,895, which discloses the ultrasonic perforating of a continuously moving strip of materials (for example an adhesive-backed plastic strip). In accordance with U.S. Pat. No. 4,747,895, the continuously moving strip passes through a gap defined by an ultrasonic horn and is brought in contact with a rotating drum that has perforating projections acting as an array of perforation elements.

This basic principle is applied to a laminate that comprises silicone gel in EP 2 382 069. The perforating elements according to EP 2 382 069 are realized as pin-like flat top projections on a rotating drum (see FIG. 2), which acts as an array (41) of perforation elements (40). Similarly, EP 1 112 823 discloses a web perforation method using a rotating drum ("pin roll") with pin-like perforation elements in an ultrasonic device. According to FIG. 4 of EP 1 112 823, the pins have a flat top.

One potential drawback of the process of ultrasonic perforating with simple (flat top) pins is that any material present in the laminate that is not thermoplastic (i.e. material that does not (fully) melt when heated), for example an adhesive as described in U.S. Pat. No. 4,747,895, or a silicone gel as described in EP 2 382 069, is squeezed to the edges of the hole. The excess material then is located around the perforation and may (partially) occlude the perforation.

In this context, see FIG. 3, showing surface scans of laminates comprising silicone gel, perforated by different techniques/perforation elements. As shown in FIG. 3 (b), the processes known from the art (using a flat top pin as perforation element) lead to the presence of a silicone "ring" (agglomerated silicone) around the edges of the perforations.

Furthermore, if simple "hole punching" is used to create perforations, "hanging" remnants of the punching process ("confetti" remaining on the punching tool and/or on the laminate) may lead to malfunction of the tool and/or interfere with the intended use of the perforated laminate, in particular any use in wound treatment.

Even when using ultrasonic perforation, i.e. when potentially avoiding the drawbacks of hole punching, the part of the laminate that is cut-out ("confetti") may cause problems at the point-of-use and needs to be removed from the product, for example by way of blowing air through the perforations, adding another process step.

A further disadvantage of conventional ultrasonic perforation with flat top pins, when used to perforate a laminate comprising silicone gel, is that it is difficult to produce perforations of a larger diameter, for example of a diameter above 2 mm. This fundamental problem is believed to be associated with the fact that the larger the flat top, the more silicone gel needs to be dislocated (removed from the cross-section to be perforated) before the perforation can be introduced into the laminate. Increased silicone gel dislocation/replacement is associated with a higher energy input that is required, and also with larger silicone gel build-up around the edge of the perforation Since the volume of silicone that needs to be dislocated/replaced increases not just linearly when the radius (and/or the grammage) is increased, conventional ultrasonic welding has significant limitations when it comes to introducing perforations into laminates comprising silicone gel.

SUMMARY OF THE INVENTION

In view of the above-mentioned or other drawbacks or unfulfilled needs of the prior art, one object of the present invention is to provide a tool and a process for ultrasonic energy input, in particular for introducing perforations into a laminate comprising a layer of silicone gel, which process improves at least one of process control, energy consumption and quality of the product laminate, optionally all of these, wherein the resulting laminate should be suitable, in particular, for use in wound treatment.

In the following, exemplary reference is made to the Figures, in particular FIGS. 4 through 7, which show exemplary embodiments that are in accordance with some or all aspects of the present invention. Any reference signs provided are meant to provide illustration of the claimed functional or structural elements, but are by no means meant to limit the claimed subject-matter to the embodiments exemplarily shown in the Figures.

Figure 4:
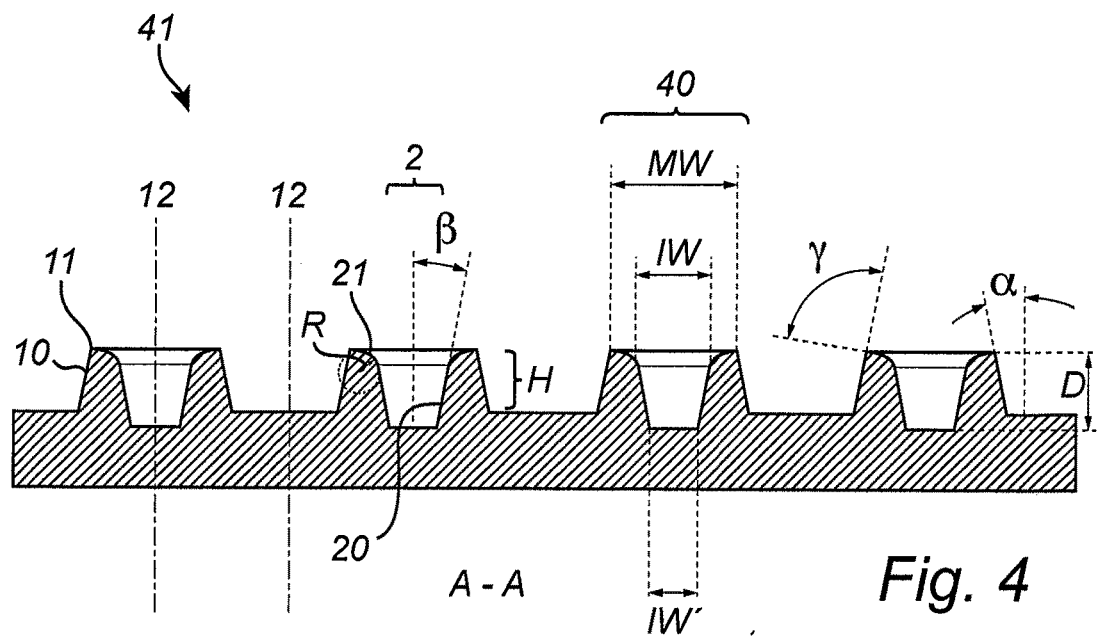

The first aspect of the invention is illustrated, for example, by FIG. 4.

In a first aspect, this object or these objects is/are solved by a perforation element for ultrasonic energy input, wherein said perforation element (40) comprises:
(A) an outer lateral surface (10) having an outer rim (11) and a longitudinal axis (12); and
(B) a recess (2) with an inner lateral surface (20);
wherein
(A1a) a maximum width MW of said outer rim (11) is in the range of from 0.5 mm to 20 mm; and/or
(A1b) an outer perimeter of said outer rim (11) is in the range of from 1.6 mm or π·0.5 mm, respectively to 63 mm or π·20 mm, respectively;
and wherein
(B1a) at least one maximum inner width IW of said recess (2), in particular a maximum inner width of said recess at at least one position or height along the longitudinal axis, respectively, is in the range of 30% to 95% of said outer rim's (11) maximum width MW; and/or
(B1b) at least one inner perimeter of said recess (2), in particular an inner perimeter of said recess at at least one position or height along the longitudinal axis, respectively, is in the range of 30% to 95% of said outer rim's (11) outer perimeter;
further wherein
(B2) the inner lateral surface (20) diverges towards the outer rim (11);
(B2.1) at least one portion of the inner lateral surface (20) is inclined with respect to the longitudinal axis (12) such that, in at least one cross-section, preferably at least one cross-section including the longitudinal axis (12), at least one tangent to the inner lateral surface intersects with said longitudinal axis, optionally at an angle beta of more than 0 degree, optionally at least 5 degrees, in particular at least 7 degrees;
and wherein
(B3) at least one portion (21) of the inner lateral surface is rounded.

Thus, in the first aspect the features (A), (B), (B2), (B2.1) and (B3) and at least one of features (A1a), (A1b) and at least one of features (B1a), (B1b) are present or realized respectively.

Among others, the present invention is based on the realization that the perforation element as defined above, when used in an ultrasonic perforation process, can perforate a laminate while, at the same time, facilitate the management, in particular removal, of the "out-perforated" or cut-out (remnant) material.

In particular, the perforation element (40) includes an outer rim (11) (e.g. sharp edge) that can produce a cut in the laminate, and, in addition, a rounded portion (21) on the inner lateral surface which does not necessarily produce a cut but rather provides a welding point (when ultrasonic energy is applied), such that the cut out ("out-perforated") material can be welded onto, e.g., a sacrificial layer of a laminate. Thereby, the management of cut out material is controlled in that the cut-out material can be collected, for example, on a sacrificial layer and the amount of loose cut-out material produced in the process can be reduced. In addition, the recess of the perforation elements contributes to the advantageous result that the amount of remnant material of the cut-out material, for example, silicone gel that may otherwise be pushed around the edges of the perforations (thus creating an uneven surface) is minimized.

Aggregation of silicone gel around the edges of a perforation is known to be a problem when flat top pins are used as perforation elements.

It is believed that the inclination (at an angle beta) of the at least one portion of the inner lateral surface (20), as exemplarily shown in FIG. 4, is advantageous in aiding with the "transfer" of the "out-perforated" part of the laminate to a "sacrificial" layer.

The term "axially" preferably denotes a/the direction parallel to or along the longitudinal axis respectively. Accordingly, a circumferential direction preferably denotes a rotational direction around said longitudinal axis and the term "radially" preferably denotes a direction perpendicular to the longitudinal axis and such circumferential direction. In other words, the terms "axially", "circumferential direction" and "radially" respectively are preferably used or to be understood in their usual or common meaning with respect to the longitudinal axis herein.

The term "perimeter" preferably denotes the perimeter length.

In embodiments of the present invention, the outer lateral surface encompasses or surrounds the longitudinal axis and/or the recess at least partially and/or the term "outer lateral surface" indicates a (lateral) surface which or whose surface normal (vector)s points away from the longitudinal axis respectively and/or the term "inner" refers to the recess or its ((inner) lateral) surface respectively. In embodiments of the present invention, the terms "outer", "outer lateral surface" and/or "inner" are preferably used or to be understood as "radially outer/inner" and/or in their usual or common meaning respectively herein.

In embodiments of the present invention, the outer lateral surface (10) (axially) ends in the outer rim (11) or the outer rim (11) (axially) terminates or delimits the outer lateral surface (10) respectively. Thus, in embodiments of the present invention, the outer rim (11) comprises an edge, border or margin of the outer lateral surface (10), in particular an (axial) edge/border/margin with respect to the axial direction of the longitudinal axis and/or cutting edge, respectively, and/or connects the outer lateral surface (10) and the (inner lateral surface (20) of the) recess (2) or an (axial, optionally planar) end face connected to the (inner lateral surface (20) of the) recess (2).

As perhaps best illustrated in FIG. 4, an outer "rim" in accordance with the invention is meant to be the actual outer edge of a perforation element, i.e. defines the outermost extension of the perforation element. In accordance with this, an outer rim (11) of the present invention is different from a flat top surface or "ring" as shown in FIG. 7, lower panel.

In preferred embodiments, the outer rim 11 is sharp ("knife edge") and the inner "rim" is a rounded portion (21), see FIG. 7, upper panel.

In embodiments of the present invention, as illustrated in FIG. 7, upper panel, said outer rim (11) is or forms such an (axial) edge/border/margin and/or the outer lateral surface (10) and the (inner lateral surface (20) of the) recess (2) or the outer lateral surface (10) and an (axial, optionally planar)

end face connected to the (inner lateral surface (20) of the) recess (2) join one another in said outer rim (11).

In other embodiments of the present invention, as illustrated in FIG. 7, lower panel, said outer rim (11) is or forms a (axial, optionally planar) end face or ring (upper flat top as shown) respectively connected to the (inner lateral surface (20) of the) recess (2) whose (radially outer) edge (axially) limits the outer lateral surface. In this embodiment, the maximum width MW is calculated from the outer edge/rim, as for all embodiments of the invention (see next section).

In embodiments of the present invention, said maximum width MW of said outer rim (11) is measured between two points of the outer rim (11), in particular its (radially outer) edge, which are, in particular radially, maximally spaced apart from one another. Thus, if the outer rim (11) has, in particular is, a circular (radially outer) edge, then said maximum width MW equals the diameter of such circular edge. If for example the outer rim (11) has, in particular is, a quadratically (radially outer) edge, then said maximum width MW equals the diagonal of such quadratically edge.

Accordingly, in embodiments of the present invention, said conditions (A1a) and (A1b) are equivalent to one another, in particular for outer rims which have, in particular are, a circular (radially outer) edge with a diameter Da=MW and an outer perimeter (length) of π·MW.

In embodiments of the present invention, said maximum inner width IW of said recess (2) is measured between two points of the recess (2) which have the same (axial) position or height along the longitudinal axis respectively and are, in particular radially, maximally spaced apart from one another. Thus, if the (inner lateral surface (20) of the) recess (2) (at this (axial) position or height along the longitudinal axis respectively) has a circular shape or cross-section perpendicular to the longitudinal axis respectively, then said maximum inner width IW equals the diameter of said circle. If for example the (inner lateral surface (20) of the) recess (2) (at this (axial) position or height along the longitudinal axis respectively) has a quadratically shape or cross-section perpendicular to the longitudinal axis respectively, then said maximum inner width IW equals the diagonal of such quadrat.

Accordingly, in embodiments of the present invention, said conditions (B1a) and (B1 b) are equivalent to one another, in particular for a(n inner lateral surface (20) of the) recess (2) which has a circular cross-section perpendicular to the longitudinal axis at a(n axial) position or height along the longitudinal axis respectively with a diameter di=IW and an inner perimeter of π·IW: IW=di=k·MW=k·Da⇒inner perimeter=π·IW=k·π·Da=k·outer perimeter, k∈[0,3; 0,95].

In embodiments of the present invention, said rounded portion (21) of the inner lateral surface is convex.

The term "convex" is used in the present application as shown in FIG. 4 and as commonly used to describe optical lenses, i.e. a convex means that the surface continuously bends towards the outside.

In embodiments of the present invention, said rounded portion (21) of the inner lateral surface directed towards the outer rim (11) has a curvature (ρ=1/R) of at most 10 mm$^{-1}$. For example, the curvature may be from 1 to 10 mm$^{-1}$.

These features may, in particular in combination, improve the welding and/or the management, in particular removal, of the "out-perforated" or cut-out (remnant) material.

In embodiments of the present invention, the outer lateral rim (11) is circular.

In embodiments, the outer lateral surface (10) is cone-shaped.

These features may, in particular in combination, improve the cutting-out of parts of the laminate.

In embodiments of the present invention, the maximum width MW of said outer rim is a diameter and the outer rim is circular.

In embodiments of the present invention, the maximum width MW of said outer rim is from 0.75 mm to 5 mm, optionally from 0.75 mm to 3 mm. In embodiments of the present invention, the outer perimeter of said outer rim is from 2.36 mm or π·0.75 mm respectively to 16 mm or π·5 mm respectively, optionally from 2.36 mm or π·0.75 mm respectively to 9 mm or π·3 mm respectively The present invention may be particularly advantageously used to obtain perforations of these dimensions.

In embodiments of the present invention, (A2) the outer lateral surface (10) converges towards the outer rim (11), and the outer lateral surface (10) is inclined with respect to the longitudinal axis (12) such that at least one tangent to the outer lateral surface intersects with the longitudinal axis, in at least one cross-section, preferably at least one cross-section including the longitudinal axis (12), at an angle alpha of more than 0 degree, optionally at least 5 degrees.

It is believed that this inclination of the outer lateral surface, as also discernible from FIG. 4 is advantageous in minimizing the amount of material sticking to the outside of the perforation element.

In embodiments of the present invention, the angle alpha is in the range of from 5 degrees to 30 degrees, optionally 7 degrees to 25 degrees, further optionally 10 degrees to 20 degrees.

In embodiments of the present invention, the angle beta is in the range of from 7 degrees to 30 degrees, optionally 9 degrees to 25 degrees, further optionally 11 degrees to 20 degrees.

In embodiments of the present invention, the inner lateral surface (20) of the recess (2) is rotationally symmetrical with respect to the longitudinal axis (12); optionally concentric to said outer rim (11).

In embodiments of the present invention, the (maximum) inner width (IW, IW') of said recess is a diameter and the recess is circular.

These features may, in particular in combination, improve the cut-out, the welding and/or the management, in particular removal, of the "out-perforated" or cut-out (remnant) material.

In embodiments of the present invention, the maximum inner width IW of said recess (2) is in the range of 40% to 90% of said outer rim's (11) maximum width MW, optionally in the range of 50% to 80% of said outer rim's maximum width MW. In embodiments of the present invention, the inner perimeter of said recess (2) is in the range of 40% to 90% of said outer rim's (11) outer perimeter, optionally in the range of 50% to 80% of said outer rim's outer perimeter.

It is believed that if the rim or (axial, optionally planar) end face as defined by or connected to the outer lateral surface and/or the recess respectively becomes too broad (thus essentially approaching the behavior of a flat top pin) the disadvantages as outlined above for a flat top pin will resurface.

In embodiments of the present invention, the inner lateral surface (20) is cone-shaped.

In embodiments of the present invention the angle beta is greater than the angle alpha, optionally beta is greater than alpha by at least 3 degrees.

In embodiments of the present invention, the outer rim is a sharp or cutting edge or sharp-edged respectively. In embodiments of the invention, the outer rim or its (radially outer) edge has a curvature of at least 20 mm$^{-1}$, preferably has no discernible curvature.

These features may, in particular in combination, support the cut-out, the welding and/or the management, in particular removal, of the "out-perforated" or cut-out (remnant) material.

According to one embodiment the recess is closed at its end opposite the outer rim. In embodiments of the present invention, the depth D of the recess, i.e. the distance from the outer rim (11) to the inner bottom surface of the recess is greater by at least 10%, optionally by at least 20%, than the elevation H of the same recess above the outer lower or bottom surface respectively on which the said recess or outer lateral surface respectively is located, i.e. the distance from the outer rim to said outer lower or bottom surface respectively.

The volume within the recess is made greater if the depth D of the recess is increased, as shown in FIG. 4. Without wishing to be bound by theory, it is believed that if the volume is too small and too much material accumulates inside the recess at the point of perforation and energy input, an overpressure may build up that may impede the perforation process and/or the process of transferring "out-perforating" to a sacrificial layer.

In embodiments of the present invention, as shown in the preferred embodiment of FIG. 7, lower panel, the outer rim (11) is or comprises a sharp edge and is connected to or is an planar end face respectively, which is then connected to the rounded/concave portion (21) of the inner lateral surface directed towards the outer rim.

Figure 6:
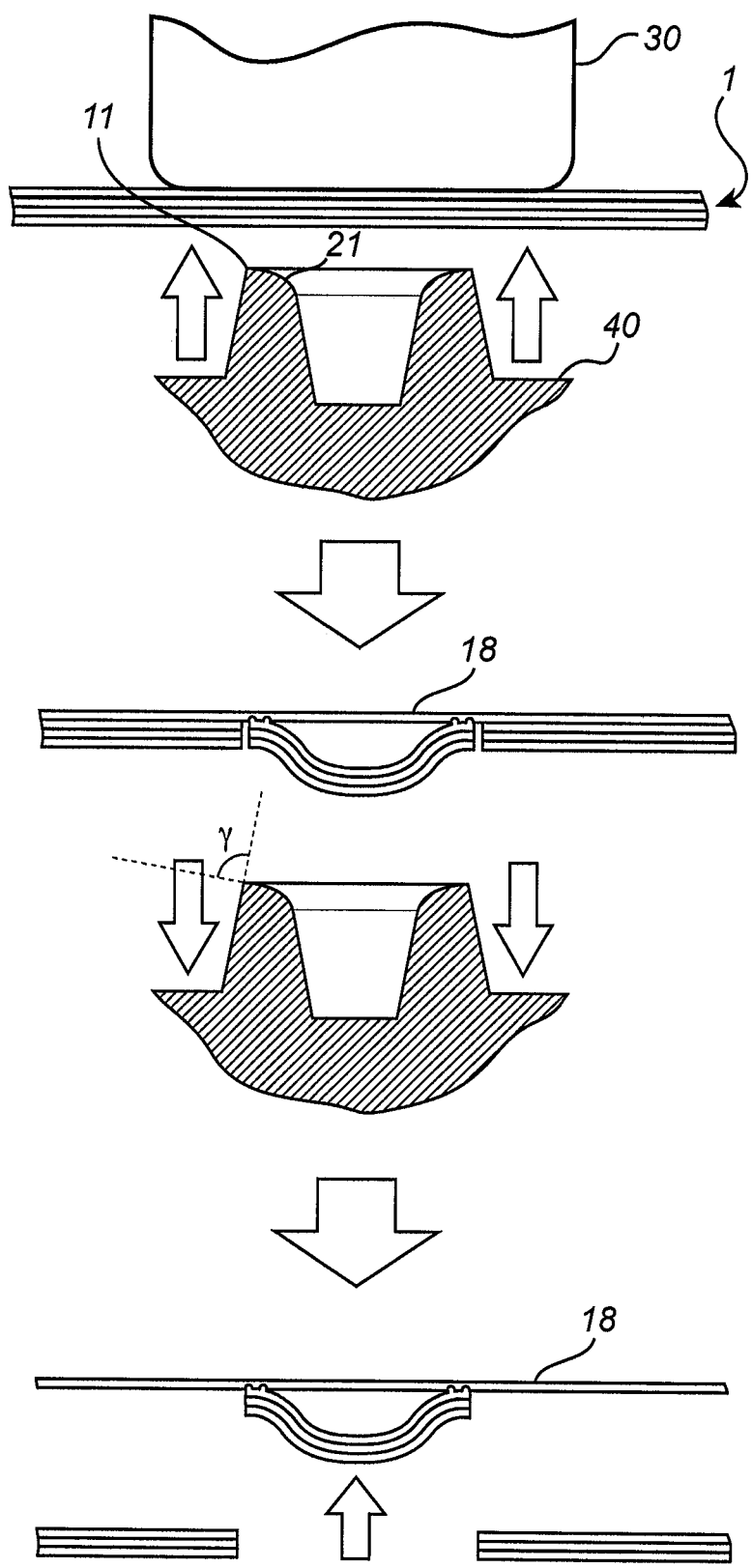

In preferred embodiments an angle gamma (as shown in FIG. 4 and FIG. 6, middle panel) between a tangent to the outer lateral surface and a tangent to said planar end face connected thereto in the outer rim is in the range of 60° to 120°.

As illustrated in the sequence of process steps shown in FIG. 6, one advantage associated with this combination of a "sharp edge" (11) and a rounded part (21), wherein one converges continuously into the other is that the outer "sharp edge" of the perforation element (40) cuts out the perforation, while, essentially in synchronicity, the rounded portion (21) does not cut the laminate but instead creates a "welding point". Among others, said welding point serves to essentially enclose at least a part of the silicone gel present in a layer in the remnant of the perforation (that will ultimately be cut out) in a pocket or pouch created from at least one thermoplastic layer and at least one further layer, for example another layer of the laminate and/or a sacrificial layer. Therefore, less silicone gel aggregates around the perforation, as is the case in methods known from the art (using flat top pins), but most silicone gel, or at least a significant part thereof, is effectively removed from the out-perforated laminate. In particular, silicone gel is efficiently removed by way of transferring the same to a sacrificial layer (18).

In accordance with the present invention, and in particular in the claims, the terms "comprising" and "comprise(s)" do not exclude other elements or steps. Use of the indefinite article "a" or "an" does not exclude a plurality of elements or steps.

The mere fact that certain measures are recited in mutually different dependent embodiment or claims does not indicate that a combination of these measures cannot be used to advantage.

Figure 5:
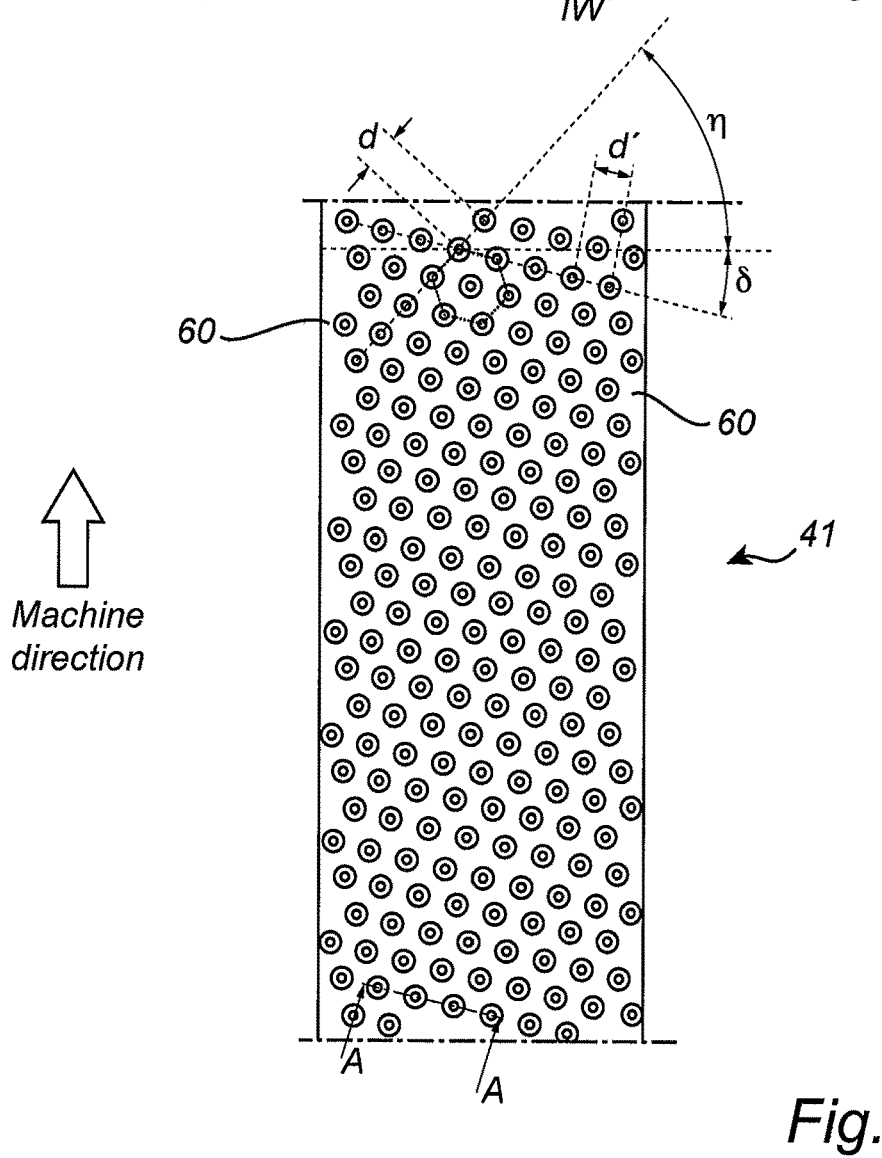

In a second aspect, as illustrated in FIG. 5, the object or objects as disclosed above is/are solved by an array (41) of perforation elements for ultrasonic energy input, wherein said array (41) comprises:
a plurality of rows (60) of perforation elements as described in any of the embodiments above, wherein at least one row comprises at least five, optionally at least eight perforation elements, further optionally wherein said array, overall, comprises from 5-70 perforation elements, further optionally from 10-60 perforation elements.

In embodiments of the present invention, rows of perforation elements are oriented at different angles relative to the axis perpendicular to the direction of movement of the array ("machine direction").

It is believed that orienting/spacing the rows of perforation elements at different angles relative to the movement of the array ("machine direction") reduces wear and friction on the surface of the ultrasonic horn (i.e. ensures a more even spread of the points of contact between the perforation elements and the surface of the horn) and also ensures a more even power consumption of the ultrasonic device during the perforation process.

In embodiments of the present invention, perforation elements are arranged in a "hexagonal" pattern, a "diamond" pattern or in a "square" pattern, relative to each other.

In embodiments of the present invention, the average distance d,d' between two perforation elements in said array is from 1 mm to 10 mm, optionally from 2 mm to 5 mm.

In embodiments of the invention, said array is part of a rotating drum.

According to a third aspect of the invention, the above-discussed and other objects are achieved through a device for ultrasonic energy input, in particular a device for introducing perforations into a laminate, said device comprising:
at least one perforation element (40) as described in any of the embodiments above, or at least one array (41) of perforation elements as described in any of the embodiments above;
at least one sonotrode (30) positioned opposite to said perforation element or said array of perforation elements as described above;
at least one means for, optionally at least partially continuously, transporting a laminate (1) through a gap between said perforation element or said array of perforation elements and said sonotrode.

According to a fourth aspect of the invention, the above-discussed and other objects are achieved through a process for at least partially introducing perforations into a laminate, said laminate comprising at least one layer of a thermoplastic material and at least one layer of a silicone gel, wherein said process comprises the following steps:
bringing at least one perforation element as described in any of the embodiments above, or a part of at least one array of perforation elements as described in any of the embodiments above, or a part of at least one device as described above, in contact with said laminate
applying ultrasonic energy to introduce at least one perforation into said laminate
transferring at least one remaining part of said perforation as introduced in the previous step, onto a sacrificial substrate.

According to a fifth aspect of the invention, the above-discussed and other objects are achieved through the use of the perforation element as described in any of the embodiments above or at least one array of perforation elements as described in any of the embodiments above, or of the device as described in any of the embodiments above, for the introduction of perforations into a laminate, wherein said laminate comprises at least one layer of silicone gel, optionally silicone gel on a thermoplastic substrate.

Silicone Gels

Silicone gels as used in the laminates of the present invention (see fourth and fifth aspect as described above) are known in the art (see e.g. WO2009/031948), in particular for use as adhesives and/or wound contact surfaces in wound care.

Specifically, silicone gels are understood to be gentle on the skin, in contrast to harder adhesives, e.g. acrylic adhesives. This is because a soft silicone gel can follow the contours of the skin well thus providing a large contact surface area. Thus, although the actual adhesive force in each contact point of a silicone gel adhesive generally is less than that of a typical acrylic adhesive, the large surface area of contact achieved with a silicone gel affords a high overall adherence to the skin, whilst at the same time, the silicone gel is skin-friendly, i.e. when a silicone gel silicone gel is removed from the skin very few skin cells are co-removed due to the comparatively low adhesive force in each contact point. Therefore, the problem of skin stripping can be avoided or minimized.

In preferred embodiments, the silicone gel comprises or is a two-component addition-hardening silicone gel. Such a two-component silicone gel may be a chemically cross-linked silicone gel, for example a polydimethyl siloxane gel, for instance a platinum catalyzed 2-component addition hardening RTV-silicone. Examples of gels that can be used are SilGel 612 from Wacker-Chemie GmbH, Burghausen, Germany, and MED-6340 from NuSil Technology, Carpinteria, USA. Examples of silicone gel gels useful in this context are also described in GB-A-2 192 142, GB-A-2 226 780 and EP-A1-0 300 620.

In embodiments of the present invention, the "grammage" (amount of silicone gel per square meter) is from 10 $g/m^2$ to 500 $g/m^2$, preferably from 15 $g/m^2$ to 200 $g/m^2$. The inventors have found that occlusion is more difficult to prevent or minimize if the grammage is too high, for example above 500 $g/m^2$.

DESCRIPTION OF EMBODIMENTS OF THE INVENTION

The present invention is illustrated by the following Figures, wherein:

FIG. 1: shows a schematic outline of elements of a device for ultrasonic energy input/"ultrasonic welding".

FIG. 2: shows a device for ultrasonic perforation of a laminate according to the art, using flat top pins.

FIG. 3: shows surface scans of perforated laminates as created by perforation using ultrasonic energy input in combination with (a) a perforating element according to an embodiment of the invention, and (b) flat top pin perforation elements (according to the art).

FIG. 4: shows an array of four perforation elements (as shown in FIG. 5) that are exemplary but illustrate the principles underlying the present invention (cross-sectional view).

FIG. 5: shows an array of perforation elements (top view)

FIG. 6: shows a flow chart schematically illustrating an embodiment of a process for at least partially introducing perforations into a laminate.

FIG. 7: shows various exemplary realizations of the rounded "inner" edge of a perforation element in accordance with the present invention.

The advantages of the invention are illustrated in the following more detailed discussion of the Figures.

FIG. 1 shows a possible set-up of a device for ultrasonic perforation. A laminate (1) is positioned between the horn (30) of a sonotrode and a perforation element (40). A transducer (31) and a power supply (50) among others, are used to control the ultrasonic energy input into the laminate.

FIG. 2 describes an ultrasonic perforation process as known in the art. A laminate (1) is continuously fed between an array (41) of perforation elements (40) and the horn (30) of a sonotrode, wherein the array is realized as a rotating drum and the perforation element is realized as a flat top pin.

FIG. 3 shows exemplary surface scans of perforated laminates as created by perforation using ultrasonic energy input in combination with (a) a perforating element according to an embodiment of the invention, and (b) flat top pin perforation elements (according to the art). As is apparent from a comparison of the prior art/flat top perforation shown in panel (b) with the result of the method according to the present invention [panel (a)], much less or almost no silicone gel aggregates around the edges of the perforations as created with a perforation element in accordance with the present invention. The significant amounts of silicone gel that are deposited around the edges in the processes according to the art that use flat top pins or other simple perforation elements generally strive to "move back" into their original position, therefore at least partially occluding the perforations so created. This negative outcome is avoided or minimized by using the perforation elements and method in accordance with the present invention.

FIG. 4 shows a cross-sectional view (A-A) of an array (41) of perforation elements (40) as shown in FIG. 5 wherein the cross section includes the longitudinal axes (12) of the perforation elements (40). Each perforation element (40) shown includes an outer rim (11), in particular a sharp edge that can produce a cut in the laminate, and, further inwards toward the recess (2) a rounded portion (21) on the inner lateral surface which does not necessarily produce a cut but rather provides a welding point (when sufficient ultrasonic energy is applied). In accordance with these functionalities, the cut out ("out-perforated") material can be welded together and/or onto a further layer, for example a sacrificial layer (18) of a laminate (cf. FIG. 6). Thereby, the management of cut out material is improved as the cut-out material can be collected on a sacrificial layer and the amount of loose cut-out material produced in the process can be reduced. As an additional advantage, the recess (2) of the perforation elements contributes to reducing the amount of remnant material of the cut-out material, for example, silicone gel, which, without the recess, or without significant recess volume, may be deposited around the edges of the perforations (thus creating an uneven surface).

FIG. 5 shows a top view of an array (41) of perforation elements (40). A first row of perforation elements is oriented at an angle delta (δ) relative to the axis perpendicular to the direction of movement of the array ("machine direction"), wherein a second row of perforation elements is oriented at an angle eta (η) relative to the axis perpendicular to the direction of movement of the array ("machine direction"). In the embodiment shown in FIG. 5, the perforating elements are arranged in a "hexagonal" pattern, wherein the sum of the angle delta (δ) and angle eta (η) is 60 degrees. In other exemplary embodiments (not shown) the perforating elements may be arranged in a "square" pattern, wherein the sum of the angle delta (δ) and angle eta (η) is 90 degrees. It is believed that orienting the rows of perforation elements at different angles relative to the axis perpendicular to the direction of the movement of the array ("machine direction") reduces wear and friction on the surface of the ultrasonic horn (i.e. ensures a more even spread of the points of contact) and also ensures a more even power consumption of the ultrasonic device during the perforation process.

As illustrated in FIG. 6, one advantage associated with the perforation element according to the present invention is that the outer "sharp edge" (11) of the perforation element (40) cuts out the perforation, while, essentially in synchronicity, the rounded portion (21) does not cut the laminate but instead creates a "welding point". Among others, said welding point serves to essentially enclose at least a part of the silicone gel present between layers in the remnant of the perforation (that will ultimately be cut out) in a pocket or pouch created from at least one thermoplastic layer and at least one further layer, for example another layer of the laminate and/or a sacrificial layer. Therefore, less silicone gel aggregates around the perforation, as is the case in methods known from the art (using flat top pins, see FIG. 3), but most silicone gel, or at least a significant part thereof, is effectively and permanently removed from the out-perforated laminate. In particular, silicone gel may be efficiently removed from the perforated laminate by way of transferring the same to a sacrificial layer (18).

FIG. 7 shows a more detailed view of a perforation element (40) having a "sharp edge" as the outer rim (11) and a rounded portion (21) of the (inner lateral surface (20) of the) recess 2), wherein the outer rim (11) joins the outer lateral surface (10) and the rounded portion (upper panel of FIG. 7) or the end face connected thereto (lower panel of FIG. 7). A perforation element of the latter design may be easier to sharpen than the embodiment shown in the upper panel of FIG. 7.

The invention claimed is:

1. A perforation element for ultrasonic energy input, wherein said perforation element comprises:
    an outer lateral surface having an outer rim and a longitudinal axis; and
    a recess having an inner lateral surface; wherein
    a maximum width MW of said outer rim is in the range of from 0.5 mm to 20 mm and/or
    an outer perimeter of said outer rim is in the range of from 1.6 mm to 63 mm; and
    wherein
    at least one maximum inner width IW of said recess is in the range of 30% to 95% of said outer rim's maximum width MW and/or
    at least one inner perimeter of said recess is in the range of 30% to 95% of said outer rim's outer perimeter;
    further wherein
    the inner lateral surface diverges towards the outer rim;
    at least one portion of the inner lateral surface is inclined with respect to the longitudinal axis such that, in at least one cross-section, at least one tangent to the inner lateral surface intersects with the longitudinal axis, optionally at an angle beta ($\beta$) of more than 0 degrees, and wherein
    at least one portion of the inner lateral surface is rounded.

2. The perforation element according to claim 1, wherein said rounded portion of the inner lateral surface directed towards the outer rim is convex.

3. The perforation element according to claim 1, wherein said rounded portion of the inner lateral surface directed towards the outer rim has a curvature (1/R) of at most 10 $mm^{-1}$.

4. The perforation element according to claim 1, wherein the outer rim is a circular outer rim, optionally wherein the outer lateral surface is cone-shaped.

5. The perforation element according to claim 1, wherein the maximum width MW of said outer rim is from 0.75 mm to 5 mm; and/or wherein the outer perimeter of said outer rim is from 2.36 mm to 16 mm.

6. The perforation element according to claim 1, wherein the outer lateral surface converges towards the outer rim, and the outer lateral surface is inclined with respect to the longitudinal axis such that, in at least one cross-section, at least one tangent to the outer lateral surface intersects with the longitudinal axis, at an angle alpha ($\alpha$) of more than 0 degrees.

7. The perforation element according to claim 6, wherein the angle alpha is at least 5 degrees.

8. The perforation element according to claim 1, wherein the angle beta is in the range of 5 degrees to 30 degrees.

9. The perforation element according to claim 1, wherein the inner lateral surface of the recess is rotationally symmetrical with respect to the longitudinal.

10. The perforation element according to claim 1, wherein the inner width (IW, IW') of said recess is a diameter and/or the recess is circular.

11. The perforation element according to claim 1, wherein the maximum inner width IW of said recess is in the range of 40% to 90% of said outer rim's maximum width MW; and/or wherein said inner perimeter of the recess is in the range of 40% to 90% of said outer rim's outer perimeter.

12. The perforation element according to claim 1, wherein the inner lateral surface is cone-shaped.

13. The perforation element according to claim 1, wherein the depth D of the recess, i.e. the distance from the outer rim to the inner bottom surface of the recess is greater by at least 10% than the elevation H of the same recess above the outer lower or bottom surface on which the said recess or outer lateral surface is located.

14. The perforation element according to claim 1, wherein an angle gamma between a tangent to the outer lateral surface and a tangent to an end face connected thereto in the outer rim is in the range of 60° to 120°.

15. An array of perforation elements for ultrasonic energy input, wherein said array comprises:
    a plurality of rows of perforation elements according to claim 1, wherein at least one row comprises at least five perforation elements.

16. The array according to claim 15, wherein said array is part of a rotating drum.

17. A device for ultrasonic energy input, said device comprising:
    at least one perforation element according claim 1
    at least one sonotrode positioned opposite to said perforation element or said array of perforation elements;
    at least one means for, optionally at least partially continuously, transporting a laminate through a gap between said perforation element or said array of perforation elements and said sonotrode.

18. A process for at least partially introducing perforations into a laminate, said laminate comprising at least one layer of a thermoplastic material and one layer of a silicone gel, wherein said process comprises the following steps:
    bringing at least one perforation element of claim 1 in contact with said laminate
    applying ultrasonic energy to introduce at least one perforation into said laminate transferring at least one remaining part of said perforation as introduced in the previous step, onto a sacrificial substrate.

* * * * *